(12) United States Patent
Muniganti et al.

(10) Patent No.: US 10,816,233 B2
(45) Date of Patent: Oct. 27, 2020

(54) ADAPTOR MODULE AND METHODS FOR CONTROLLING A REPLACEMENT MOTOR

(71) Applicant: Regal Beloit America, Inc., Beloit, WI (US)

(72) Inventors: Harish Muniganti, Telangana (IN); Mrudul Omprakash Vaishya, Telangana (IN); Vijay Kambhammettu, Telangana (IN); Harry Robert Wilson, Auburn, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 167 days.

(21) Appl. No.: 15/914,539

(22) Filed: Mar. 7, 2018

(65) Prior Publication Data
US 2019/0277527 A1 Sep. 12, 2019

(51) Int. Cl.
| | |
|---|---|
| *F24F 11/37* | (2018.01) |
| *F24F 11/49* | (2018.01) |
| *H02P 6/08* | (2016.01) |
| *F24F 11/64* | (2018.01) |
| *F24F 11/65* | (2018.01) |
| *F24F 11/58* | (2018.01) |

(52) U.S. Cl.
CPC ............. *F24F 11/37* (2018.01); *F24F 11/49* (2018.01); *F24F 11/58* (2018.01); *F24F 11/64* (2018.01); *F24F 11/65* (2018.01); *H02P 6/08* (2013.01)

(58) Field of Classification Search
None
See application file for complete search history.

(56) References Cited

U.S. PATENT DOCUMENTS

| | | | |
|---|---|---|---|
| 8,063,593 B2 | 11/2011 | Mullin | |
| 9,614,468 B2 * | 4/2017 | Hu | ............................ H02P 6/08 |
| 2011/0260671 A1 | 10/2011 | Jeung | |
| 2015/0296050 A1 | 10/2015 | Bomkamp et al. | |
| 2018/0356847 A1 * | 12/2018 | Mohalley | ................ F24F 11/30 |

\* cited by examiner

*Primary Examiner* — Mohammad Ali
*Assistant Examiner* — Sheela Rao
(74) *Attorney, Agent, or Firm* — Armstrong Teasdale LLP

(57) ABSTRACT

An adaptor module and methods for controlling a replacement motor in a heating, ventilation, and air conditioning (HVAC) system are provided. The adaptor module includes a plurality of tap connectors, each configured to receive a control signal. The adaptor module also includes a user interface having a plurality of switches that are adjustable into a plurality of different configurations, wherein each of the plurality of configurations correlates to at least one stored operating parameter for application to the motor. The adaptor module also includes a processing device configured to determine an operating parameter at which to operate the motor based on the configuration of the plurality of switches and based on a determination of which tap connector is receiving the control signal. The adaptor module also transmits a command signal including instructions for the motor to operate in accordance with the determined operating parameter.

19 Claims, 2 Drawing Sheets

ADAPTOR MODULE AND METHODS FOR CONTROLLING A REPLACEMENT MOTOR

BACKGROUND

The embodiments described herein relate generally to motors, and more particularly, to systems and methods for controlling a motor in a heating, ventilation, air conditioning (HVAC) system.

Many known HVAC and fluid circulation systems employ single-phase alternating current (AC) permanent split capacitor (PSC) motors. PSC motors are generally controlled by connecting input power to one of a plurality of input taps of the AC motor depending on a desired operating mode. Environmental regulations continue to increase efficiency and controllability requirements of HVAC motors. However, such AC motors have low efficiencies, consume more energy, and are limited regarding their degree of control.

As a result, direct current (DC) motors such as electronically commutated motors (ECMs) have been developed, and generally have higher efficiencies, are more energy saving and environmentally friendly, and have a much higher degree of control than PSC motors. Therefore, the AC motors in conventional HVAC and fluid circulation systems are gradually being replaced by DC motors. However, the AC motors are coupled directly to line input power signals (such as 120 VAC, 240 VAC, or 277 VAC) provided by an HVAC system controller, whereas the DC motors being used as replacement motors are configured to receive a low-voltage command signal (e.g. a pulse width modulation signal less than about 30 V). The two signals are not compatible.

BRIEF DESCRIPTION

In one aspect, an adaptor module configured to control a motor in a heating, ventilation, and air conditioning (HVAC) system is provided. The adaptor module includes a plurality of tap connectors, each configured to receive a control signal. The adaptor module also includes a user interface having a plurality of switches that are adjustable into a plurality of different configurations, wherein each of the plurality of configurations correlates to at least one stored operating parameter for application to the motor. The adaptor module also includes a processing device configured to determine an operating parameter at which to operate the motor based on the configuration of the plurality of switches and based on a determination of which tap connector is receiving the control signal. The adaptor module also transmits a command signal including instructions for the motor to operate in accordance with the determined operating parameter.

In another aspect, a method of controlling a motor in a heating, ventilation, and air conditioning (HVAC) system using an adaptor module is provided. The method includes receiving a control signal at a tap connector of a plurality of tap connectors. The method also includes determining a configuration of a plurality of switches of a user interface, wherein the configuration of the plurality of switches correlates to at least one stored operating parameter for application to the motor. The method also includes determining an operating parameter at which to operate the motor based on the configuration of the plurality of switches of the user interface and based on a determination of which tap connector is receiving the control signal. The method also includes transmitting a command signal including instructions for the motor to operate in accordance with the determined operating parameter.

In another aspect, a replacement motor system for replacing an alternating current (AC) motor in a heating, ventilation, and air conditioning (HVAC) system is provided. The replacement motor system includes a direct current (DC) motor and an adaptor module configured to control the DC motor. The adaptor module includes a plurality of tap connectors, each tap connector configured to receive a control signal. The adaptor module also includes a user interface having a plurality of switches that are adjustable into a plurality of different configurations, wherein each of the plurality of configurations correlates to at least one stored operating parameter for application to the DC motor. The adaptor module also includes a processing device configured to determine an operating parameter at which to operate the DC motor based on the configuration of the plurality of switches and based on a determination of which tap connector is receiving the control signal. The adaptor module also transmits a command signal including instructions for the DC motor to operate in accordance with the determined operating parameter.

DETAILED DESCRIPTION

Many conventional HVAC systems utilize alternating current (AC) motors for air handlers and condensers. The use of AC motors in an HVAC application may result in a relatively inefficient operation. By contrast, an ECM typically uses less energy than an AC motor or PSC (permanent-split capacitor) motor such as are commonly used to move air in HVAC systems. The ECM may also offer more control over the motor speed than conventional AC motors, which is also beneficial in HVAC applications. However, conventional AC motors are powered and controlled using AC power, and therefore conventionally it has been not been possible to substitute such conventional AC motors via a drop-in replacement DC motor.

The embodiments described herein provide an adaptor module and methods of controlling a motor. The motor is controlled by a heating, ventilation and air conditioning (HVAC) system controller. The motor may include plurality of operating parameter ranges and the HVAC system controller provides an input operating mode for selecting one of the plurality of operating parameter ranges. The adjustment module is coupled between the HVAC system controller and the motor. The adjustment module may define the plurality of operating parameters, each associated with one of the plurality of operating modes. The adjustment module selects one of the plurality of operating parameters on the basis of control signals received from the HVAC system controller, and commands the motor according to the operating parameter associated with the selected operating mode. Further, the adjustment module includes the ability to manually adjust the values of the operating parameters. The adaptor module facilitates replacing or retrofitting a failed motor in a HVAC system with a readily available, stock, retrofit/replacement motor. The adaptor module provides a cost-effective solution to interfacing between HVAC system controllers, thermostats and replacement motors. Further, the adaptor module facilitates returning a failed HVAC system to operation quickly and efficiently (e.g., in one service call). Further, certain embodiments enable a DC motor system to be used as a drop-in replacement of an AC motor (e.g., a PSC motor), such as in an HVAC system or other air mover system. Further, certain embodiments do not require extensive reconfiguration of the AC interface signals when replacing the AC motor with the DC motor.

Figure 1:
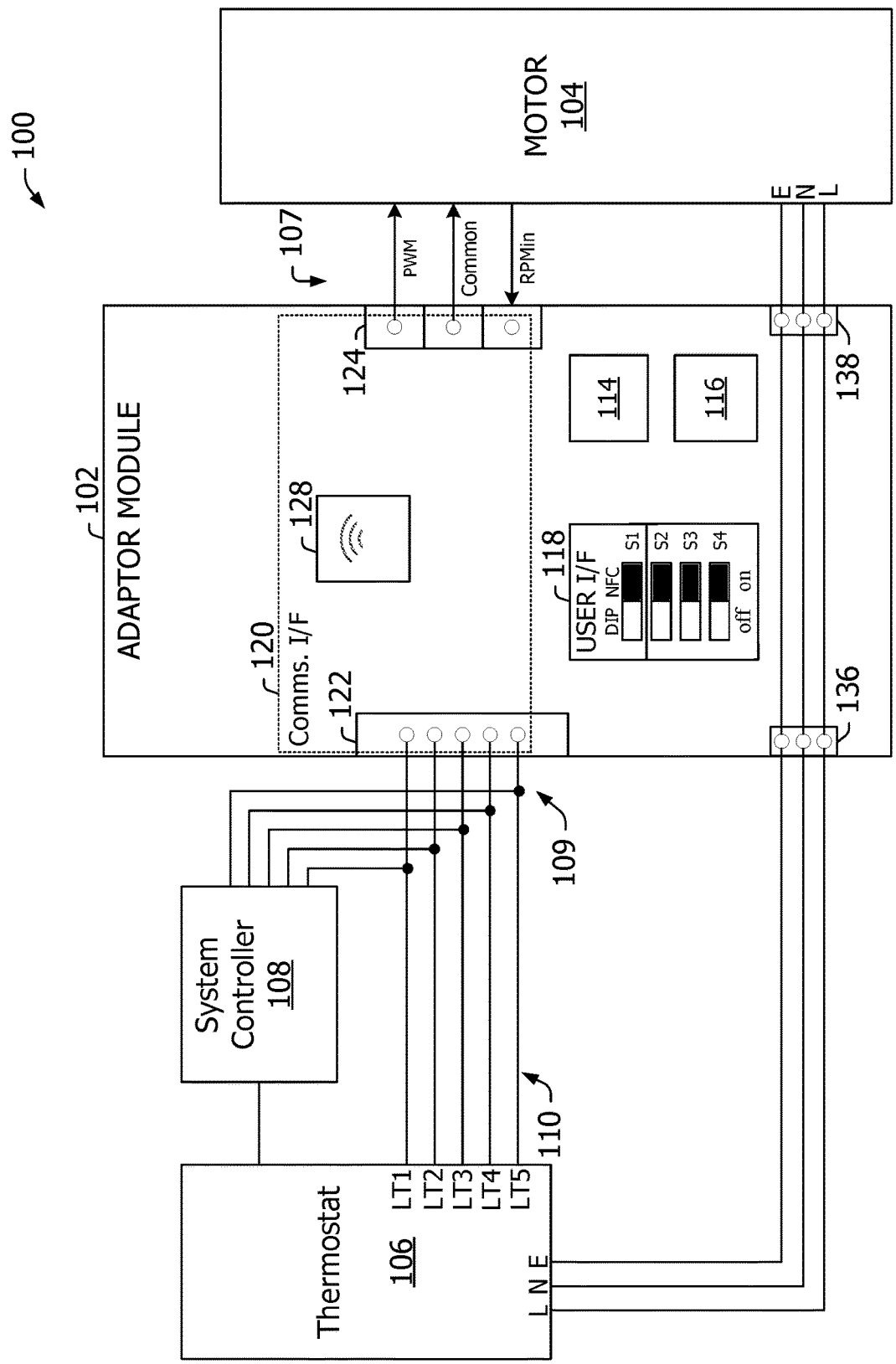
FIG. 1 is a schematic diagram of an exemplary HVAC system that includes an adaptor module for controlling a motor.

FIG. 1 is a schematic diagram of a heating, ventilation, and air conditioning (HVAC) system 100 that includes an adaptor module 102 and a retrofit motor 104. HVAC system 100 also includes a thermostat 106 and/or a system controller 108. Adaptor module 102 is coupled to and configured to receive signals from system controller 108. Further, adaptor module 102 is coupled to and configured to transmit signals to motor 104.

In the exemplary embodiment, motor 104 is an electronically commutated motor (ECM), which may also be referred to as a brushless direct current (DC) motor. Motor 104 is utilized as a fan and/or blower motor in HVAC system 100. Alternatively, motor 104 may be implemented in any other application including, but not limited to, a fluid (e.g., water, air, etc.) moving system, a clean room filtering system, a fan filter unit, a variable air volume system, a refrigeration system, a furnace system, and/or an air conditioning system. In the exemplary embodiment, HVAC system 100 is retrofit to include motor 104 that replaces an existing permanent split capacitor (PSC) motor (hereinafter referred to as "replaced motor", not shown).

Motor 104 is suitably receptive to speed commands, torque commands, and/or airflow commands. Speed commands may adjust the operating speed of motor 104, torque commands may adjust the operating torque of motor 104, and airflow commands may adjust an airflow output by motor 104. Further, speed commands, torque commands, and/or airflow commands may be embodied by command signal 107, such as a pulse width modulated (PWM) signal, a digital serial communication signal, or the like.

System controller 108 includes thermostat 106 that controls HVAC system 100 and provides adaptor module 102 with control signals 109 indicating an operating mode of HVAC system 100. In certain embodiments, the control signals 109 include one or more signals generated by thermostat 106 that specify, for example, a cooling mode, a heating mode, or a fan only mode, and/or at a first stage or at a second stage.

In the exemplary embodiment, system controller 108 includes a plurality of system tap output connectors 110, for example, five tap output connectors LT1, LT2, LT3, LT4, LT5. System tap output connectors 110 are configured to connect to taps of a motor, such as the replaced PSC motor and/or motor 104, where each system tap output connector 110 is suitably mapped to operating modes (e.g., heating, cooling, etc.) of HVAC system 100 by system controller 108, whereby system tap output connectors 110 are generally activated on the basis of operating mode. That is, system tap output connectors 110 provide control signals to the adaptor module 102 via signals 109. An activated system tap output connector 110 generally provides line voltage from a utility power source as signals 113, such as 120 VAC, 240 VAC, or 277 VAC. Only one of system tap output connectors 110 is selected to be activated at a time, and the remaining system tap output connectors 110 are not activated and, thus, have no power supplied thereto.

Adaptor module 102 controls motor 104 on the basis of command signals. The control signals are suitably received from system controller 108 and/or thermostat 106, and include the operating mode of HVAC system 100. When a control signal is received, adaptor module 102 suitably determines and instructs motor 104 to run at an associated speed, torque, or airflow.

In the exemplary embodiment, adaptor module 102 includes components mounted to a printed circuit board. More specifically, in the exemplary embodiment, adaptor module 102 includes a processing device 114, a memory device 116, a user interface 118, and a communication interface 120.

The term "processing device", as used herein, refers to central processing units, microprocessors, microcontrollers, reduced instruction set circuits (RISC), application specific integrated circuits (ASIC), logic circuits, and any other circuit or processor capable of executing the functions described herein.

It should be noted that the embodiments described herein are not limited to any particular processor for performing the processing tasks of the invention. The term "processing device," as that term is used herein, is intended to denote any machine capable of performing the calculations, or computations, necessary to perform the tasks of the invention. The term "processing device" also is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks described herein, as will be understood by those skilled in the art.

Communication interface 120 includes an input tap connector 122 and a data output connector 124. Input tap connector 122 is configured to receive system tap output connectors 110, for example, via individual wires, via a plug/socket arrangement, or otherwise. For example, in the exemplary embodiment, the control signal includes a 120 VAC/240 VAC/277 VAC control signal. Alternatively, the control signal may include a 0-10 volts direct current (VDC) control signal, a 0-5 VDC control signal, a 4-20 milliampere (mA) control signal, and/or any other type of control signal that allows adaptor module 102 to function as described herein. Data output connector 124 includes one or more data lines (e.g., PWM/Common/RPMin) for coupling to motor 104. Data output connector 124 may include, for example, a RS-485 connector, a DSI connector, a control wire reception terminal, and/or any other type of interface that enables adaptor module 102 to communicate with motor 104.

Memory device 116 may be included within processing device 114, or may be coupled to processing device 114. In the exemplary embodiment, memory device 116 stores a plurality of different communications protocols. For example, processing device 114 may access the communications protocols stored in memory device 116 in order to translate a signal received from a user via communication interface 120 into a format that may be transmitted to motor 104. More specifically, processing device 114 may receive a signal sent using a protocol with which motor 104 may not be compatible. Processing device 114 translates the received signal to a communication suitable to be transmitted to motor 104.

Memory device 116 also stores operating parameter data to be used by processing device 114 to generate the command signal for motor 104 based on the control signal received from system controller 108. The operating parameter data is stored in the form of a lookup table or a database. When control signal 109 indicating the operating mode of the HVAC system 100 is received, processing device 114 looks up the corresponding operating parameter associated with the operating mode, wherein the operating parameter is an operating speed, operating torque, or operating airflow.

User interface 118 enables user-interaction with adaptor module 102 for specifying and/or adjusting the values of the operating parameters associated with system tap output connectors 110 and stored in memory device 116. In the exemplary embodiment, user interface 118 is a four-switch device that includes a first switch S1, a second switch S2, a third switch S3, and a fourth switch S4. First switch S1 enables the user to specify whether to operate switches S2-S4 in DIP switch mode or in a near field communication (NFC) mode. DIP switch mode causes user input devices 126 to operate as DIP switches, where different configurations of switches S2-S4 are correlated with individual locations of the lookup table that contain operational values. NFC mode enables the user to view, set, and/or define the operational values in the lookup table that are associated with various positions of switches S2-S4, as described in more detail herein. Second, third, and fourth switches S2-S4 enable the user to set 8 different switch configurations associated with 8 different operational values for motor 104 for each of tap output connectors LT1-LT5.

In the exemplary embodiment, user interface 118 is either a DIP switch or a rotary switch that includes switches (or switch positions) S1-S4. In alternative embodiments, user interface 118 may include buttons, relays, and/or any other known input device that enables user interface 118 to function as described herein. User interface 118 facilitates configuration (i.e., setup) of adaptor module 102. User interface 118 further enables selection of operational values or operating parameters such as a speed, torque, and/or airflow for association with each tap connector 122. In alternative embodiments, user interface 118 may additionally include a plurality of buttons, a display, and/or any other known devices for interfacing with a user.

Each configuration of switches S2-S4 of user interface 118 correlates to the lookup table stored in memory device 116. More specifically, each configuration of switches S2-S4 correlates to a predefined level of the operating parameter to be applied to motor 104. For example, a first configuration of switches S2-S4 may correlate to 30% of the maximum operating parameter (e.g., speed, torque, or airflow) of motor 104, a second configuration of switches S2-S4 may correlate to 40% of the maximum operating parameter, a third configuration of switches S2-S4 may correlate to 50% of the maximum operating parameter, etc.

Further, in the exemplary embodiment, first switch S1 may be positioned to specify the NFC mode, enabling adaptor module 102 to communicate with an external wireless computing device (e.g., smartphone, tablet, PDA, etc., not shown) using wireless communication (e.g., NFC, Wi-Fi, Bluetooth, RFID, etc.). In such an embodiment, communication interface 120 of adaptor module 102 includes a wireless communications module 128 that enables the wireless communication. The external wireless computing device runs/executes an application that provides user interface 118 and feedback functions. More specifically, the application enables a user to program the command signals provided to motor 104. That is, the operating parameters associated with each configuration of switches S2-S4, may be adjusted by the user and stored in memory device 116. Wireless communications module 128 receives adjusted operating parameters transmitted from the external wireless computing device and communicates the adjusted operating parameters to processing device 114 for storage within memory device 116.

To control motor 104, adaptor module 102 determines the operating parameter command based on the control signal received via the activated system tap output connector 110. The operating parameter command may be a speed command, a torque command, or an airflow command. Adaptor module 102 generates command signals to be transmitted to motor 104. The command signals may be in the form of PWM signals or DSI signals.

To power motor 104, adaptor module 102 includes an input power connector 136 and an output power connector 138. Input power connector 136 is configured to be coupled to line input power provided via thermostat 106 or system controller 108. Specifically, input power connector 136 is configured to receive a line power wire L, a neutral power wire N, and an earth ground wire E. Line, neutral, and earth ground power wires L, N, E pass through adaptor module 102 and are provided to motor 104 via output power connector 138.

Thus, adaptor module 102 enables the replacement of an AC motor that is typically used in an HVAC system with a highly efficient electrically commutated motor ("ECM"), optionally as a drop-in replacement. Adjustment module 102 suitably instructs motor 104 as to a speed, torque, or airflow to use, where these instructions are based on input from one or more control signals, such as the control signals 109 of FIG. 1.

Figure 2:
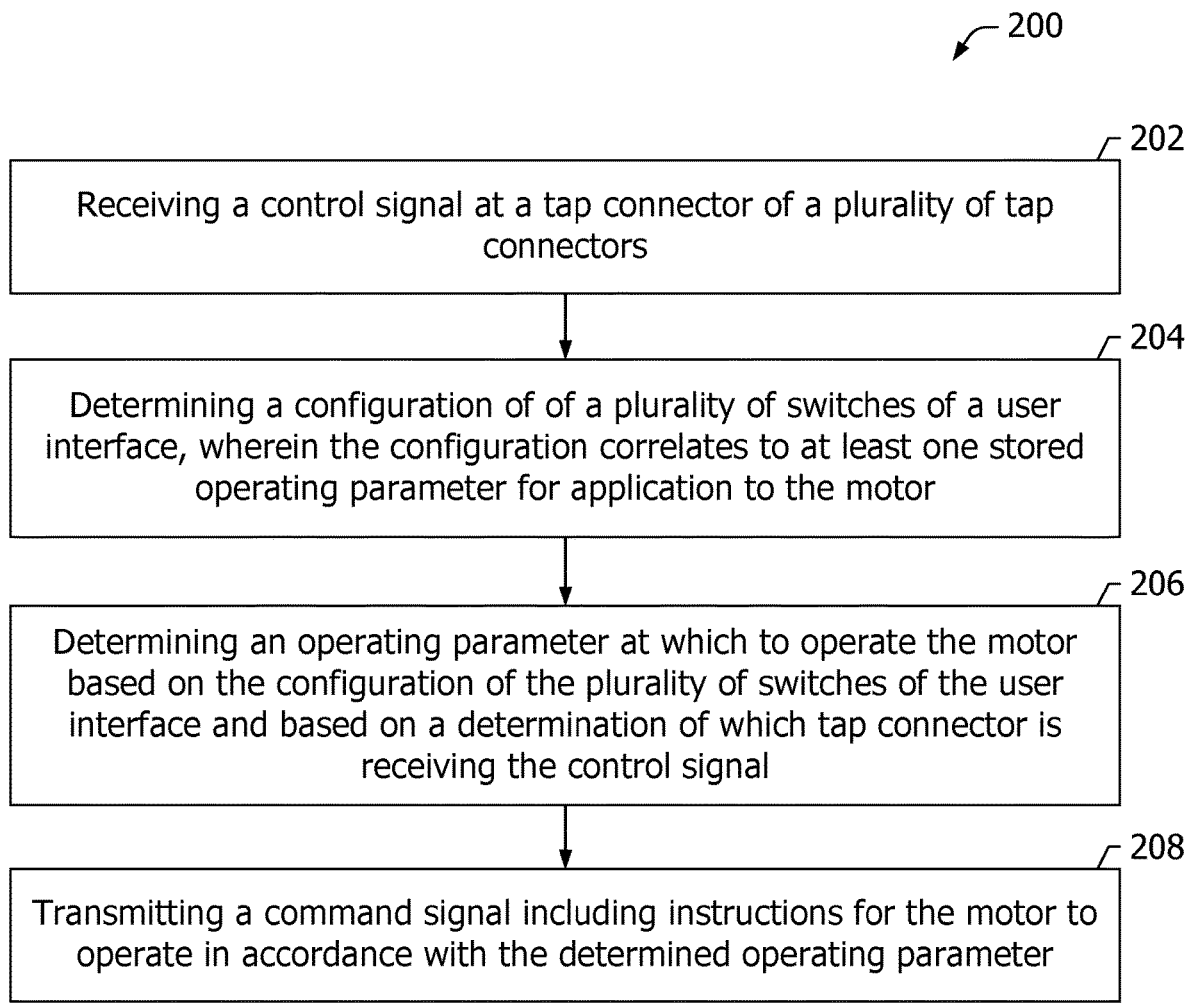
FIG. 2 is a flowchart of an exemplary method of controlling a motor using the adaptor module shown in FIG. 1.

FIG. 2 is a flowchart of an exemplary method 200 of controlling a motor in a HVAC system using adaptor module 102 (shown in FIG. 1).

Initially, method 200 includes receiving 202 a control signal 109 at a tap output connector 110 of a plurality of tap output connectors 110. Method 200 also includes determining 204, by processing device 114, a configuration of switches S1-S4 of a user interface 118, wherein the configuration of the plurality of switches correlates to at least one stored operating parameter for application to the motor. Method 200 further includes determining 206, by processing device 114, an operating parameter at which to operate the motor based on the configuration of the plurality of switches of the user interface and based on a determination of which tap connector is receiving the control signal. Method 200 also includes transmitting 208, by processing device 114, a command signal 107 including instructions for motor 104 to operate in accordance with the determined operating parameter.

In one embodiment, transmitting command signal 107 includes transmitting a low-voltage command signal including one of a PWM signal and a DSI signal.

In another embodiment, receiving the control signal includes receiving a high-voltage signal including one of a 120 VAC signal, a 240 VAC signal, and a 277 VAC signal.

In another embodiment, determining the configuration of the plurality of switches includes determining a configuration of one of a DIP switch and a rotary switch.

In another embodiment, adaptor module 102 includes wireless communication module 128. Method 200 further includes determining the plurality of switches of the user interface are arranged in a predefined configuration, receiving, via wireless communication module 128, adjusted operating parameters input by a user using an external computing device, and storing the adjusted operating parameters in the memory device 116.

In another embodiment, receiving control signal 109 further includes receiving the control signal from one of an HVAC system controller and a thermostat.

The embodiments described herein provide an adaptor module and methods of controlling a motor. The motor is controlled by a heating, ventilation and air conditioning (HVAC) system controller. The motor may include plurality of operating parameter ranges and the HVAC system controller provides an input operating mode for selecting one of the plurality of operating parameter ranges. The adjustment module is coupled between the HVAC system controller and the motor. The adjustment module may define the plurality of operating parameters, each associated with one of the plurality of operating modes. The adjustment module selects one of the plurality of operating parameters on the basis of control signals received from the HVAC system controller, and commands the motor according to the operating parameter associated with the selected operating mode. Further, the adjustment module includes the ability to manually adjust the values of the operating parameters. The adaptor module facilitates replacing or retrofitting a failed motor in a HVAC system with a readily available, stock, retrofit/replacement motor. The adaptor module provides a cost-effective solution to interfacing between HVAC system controllers, thermostats and replacement motors. Further, the adaptor module facilitates returning a failed HVAC system to operation quickly and efficiently (e.g., in one service call). Further, certain embodiments enable a DC motor system to be used as a drop-in replacement of an AC motor (e.g., a PSC motor), such as in an HVAC system or other air mover system. Further, certain embodiments do not require extensive reconfiguration of the AC interface signals when replacing the AC motor with the DC motor.

Exemplary embodiments of the adaptor module and methods of controlling a motor are described above in detail. The adaptor module and methods are not limited to the specific embodiments described herein, but rather, components of the adaptor module and/or steps of the method may be utilized independently and separately from other components and/or steps described herein. For example, the control system and methods may also be used in combination with other motor systems and methods, and are not limited to practice with only the HVAC system as described herein. Rather, the exemplary embodiments can be implemented and utilized in connection with many other system applications or other support.

A technical effect of the system described herein includes at least one of: (a) receiving a control signal at a tap connector of a plurality of tap connectors; (b) determining a configuration of a user input device of a plurality of user input devices associated with the tap connector of the plurality of tap connectors receiving the control signal, wherein each user input device is configurable to specify operating parameters for the motor; (c) determining an operating parameter at which to operate the motor based on the configuration of the user input device associated with the tap connector receiving the control signal; (d) transmitting a command signal including instructions for the motor to operate in accordance with the determined operating parameter; (e) replacing or retrofitting a failed motor in a HVAC system with a readily available, stock, retrofit/replacement motor; (f) provides a cost-effective solution to interfacing between HVAC system controllers, thermostats and replacement motors; and (g) facilitates returning a failed HVAC system to operation quickly and efficiently.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An adaptor module configured to control a motor in a heating, ventilation, and air conditioning (HVAC) system, said adaptor module comprising:
   a plurality of input tap connectors, each input tap connector of said plurality of input tap connectors configured to receive a control signal;
   a user interface comprising a plurality of switches that are adjustable into a plurality of different configurations, wherein each of the plurality of configurations correlates to at least one stored operating parameter for application to the motor;
   a processing device coupled to a memory device, said processing device configured to:
      determine which input tap connectors of said plurality of input tap connectors are receiving the control signal;
      determine a current operating mode of a plurality of operating modes based on which input tap connectors of said plurality of input tap connectors are receiving the control signal;
      determine a current operating parameter at which to operate the motor using a lookup table based on a current configuration of the plurality of different configurations of said plurality of switches of said user interface and based on the current operating mode, wherein the lookup table includes a plurality of locations, each location of the plurality of locations storing an operating parameter of the at least one stored operating parameter, and wherein each location of the plurality of locations is specified by an operating mode of the plurality of operating modes and a configuration of the plurality of configurations; and
      transmit a command signal including instructions for the motor to operate in accordance with the determined current operating parameter.

2. The adaptor module of claim 1, wherein the command signal is a low-voltage command signal including one of a PWM signal and a DSI signal.

3. The adaptor module of claim 1, wherein the control signal comprises a high-voltage signal including one of a 120 VAC signal, a 240 VAC signal, and a 277 VAC signal.

4. The adaptor module of claim 1, wherein the at least one stored operating parameter includes at least one of speed, torque, and airflow.

5. The adaptor module of claim 1, wherein said user interface comprises one of a DIP switch and a rotary switch.

6. The adaptor module of claim 1, further comprising a wireless communication module, wherein a predefined configuration of one switch of said plurality of switches facilitates receiving adjusted operating parameters input by a user using an external computing device.

7. The adaptor module of claim 1, further comprising a data output connector configured to provide the command signal from said adaptor module to the motor.

8. The adaptor module of claim 1, further comprising:
an input power connector configured to receive line input power provided to said adaptor module; and
an output power connector configured to provide the line input power to the motor.

9. The adaptor module of claim 1, wherein the control signal is received from one of an HVAC system controller and a thermostat.

10. A method of controlling a motor in a heating, ventilation, and air conditioning (HVAC) system using an adaptor module, the adaptor module including a processing device coupled to a memory device, said method comprising:
receiving a control signal at an input tap connector of a plurality of input tap connectors;
determining, by the processing device, which input tap connectors of said plurality of input tap connectors are receiving the control signal;
determining, by the processing device, a current operating mode of a plurality of operating modes based on which input tap connectors of said plurality of input tap connectors are receiving the control signal;
determining, by the processing device, a current configuration of a plurality of configurations of a plurality of switches of a user interface;
determining, by the processing device, current operating parameter at which to operate the motor using a lookup table based on the current configuration of the plurality of switches of the user interface and based on the current operating mode, wherein the lookup table includes a plurality of locations, each location of the plurality of locations storing an operating parameter of at least one stored operating parameter, and wherein each location of the plurality of locations is specified by an operating mode of the plurality of operating modes and a configuration of the plurality of configurations; and
transmitting, by the processing device, a command signal including instructions for the motor to operate in accordance with the determined current operating parameter.

11. The method of claim 10, wherein transmitting the command signal comprises transmitting a low-voltage command signal including one of a PWM signal and a DSI signal.

12. The method of claim 10, wherein receiving the control signal comprises receiving a high-voltage signal including one of a 120 VAC signal, a 240 VAC signal, and a 277 VAC signal.

13. The method of claim 10, wherein determining the configuration of the plurality of switches comprises determining a configuration of switches included on one of a DIP switch and a rotary switch.

14. The method of claim 10, wherein the adaptor module includes a wireless communication module, said method further comprises:
determining the plurality of switches of the user interface are arranged in a predefined configuration;
receiving, by the processing device via the wireless communication module, adjusted operating parameters input by a user using an external computing device; and
storing, by the processing device, the adjusted operating parameters in the memory device.

15. The method of claim 10, wherein receiving the control signal further comprises receiving the control signal from one of an HVAC system controller and a thermostat.

16. A replacement motor system for replacing an alternating current (AC) motor in a heating, ventilation, and air conditioning (HVAC) system, said replacement motor system comprising:
a direct current (DC) motor; and
an adaptor module configured to control said DC motor, said adaptor module comprising:
a plurality of input tap connectors, each input tap connector of said plurality of input tap connectors configured to receive a control signal;
a user interface comprising a plurality of switches that are adjustable into a plurality of different configurations, wherein each of the plurality of configurations correlates to at least one stored operating parameter for application to the DC motor; and
a processing device coupled to a memory device, said processing device configured to:
determine which input tap connectors of said plurality of input tap connectors are receiving the control signal;
determine a current operating mode of a plurality of operating modes based on which input tap connectors of said plurality of input tap connectors are receiving the control signal;
determine current operating parameter at which to operate said DC motor using a lookup table based on a current configuration of the plurality of different configurations of said plurality of switches of said user interface and based on the current operating mode, wherein the lookup table includes a plurality of locations, each location of the plurality of locations storing an operating parameter of the at least one stored operating parameter, and wherein each location of the plurality of locations is specified by an operating mode of the plurality of operating modes and a configuration of the plurality of configurations; and
transmit a command signal including instructions for said DC motor to operate in accordance with the determined current operating parameter.

17. The replacement motor system of claim 16, wherein the control signal comprises a high-voltage signal including one of a 120 VAC signal, a 240 VAC signal, and a 277 VAC signal, and the command signal comprises a low-voltage command signal including one of a PWM signal and a DSI signal.

18. The replacement motor system of claim 16, wherein each configuration of the plurality of configurations specifies of location within a lookup table that stores an operating parameter of said plurality of operating parameters.

19. The replacement motor system of claim 16, wherein the AC motor is a permanent split capacitor motor and said DC motor comprises an electronically commutated motor.

* * * * *